No. 792,892. PATENTED JUNE 20, 1905.
G. M. GEST.
SYSTEM AND MEANS FOR LAYING ELECTRICAL WIRES IN CONDUITS.
APPLICATION FILED FEB. 14, 1903.
2 SHEETS—SHEET 1.
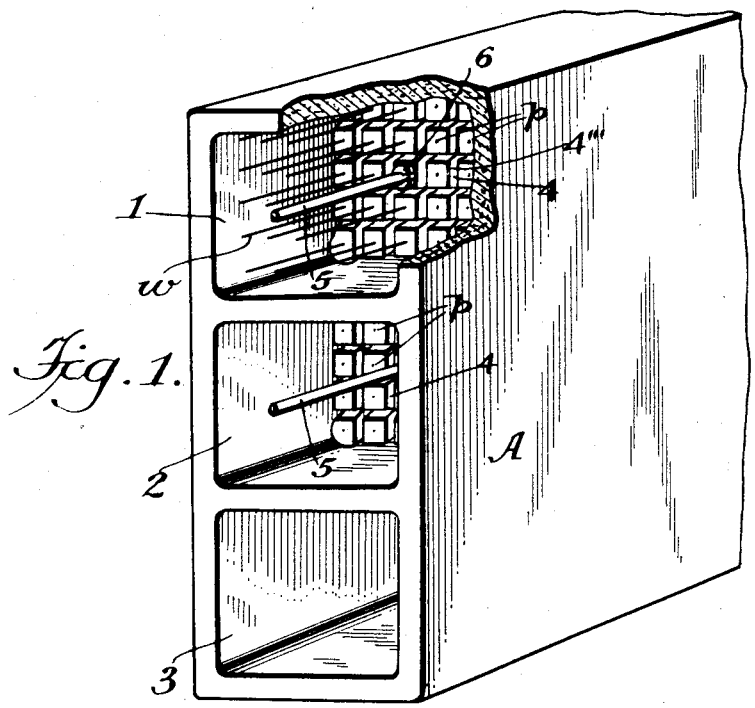
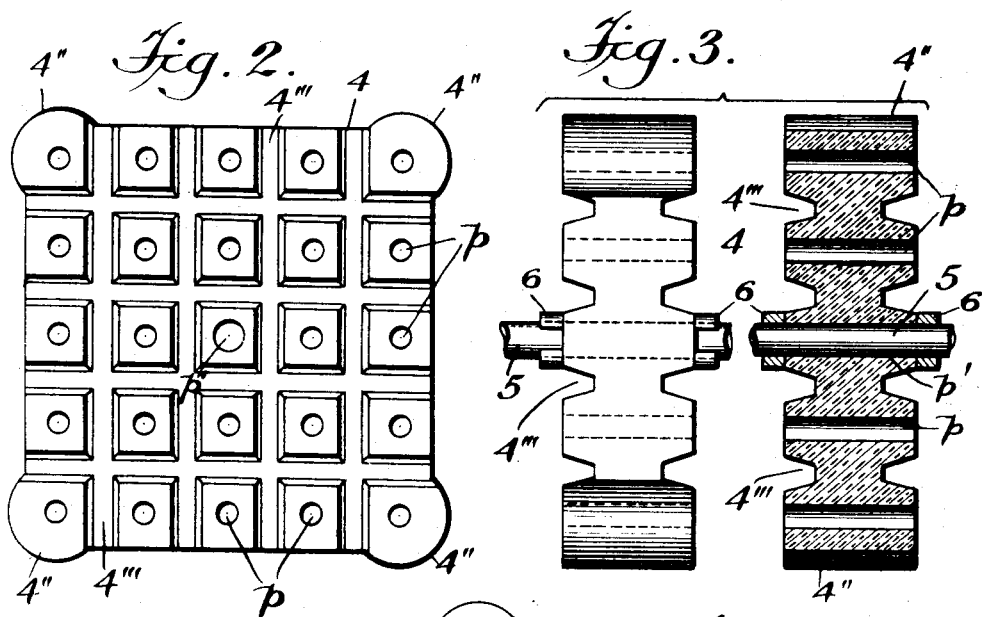

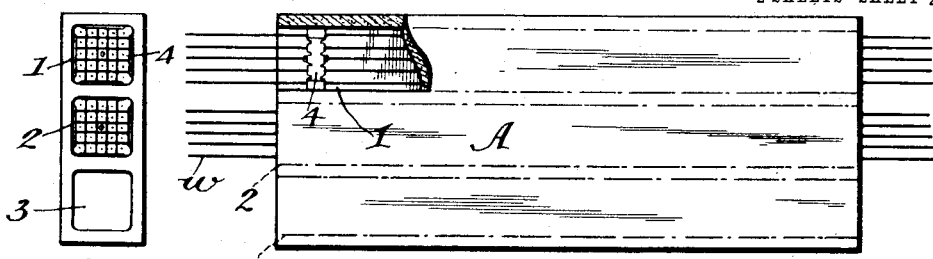
Fig. 4.  Fig. 5.
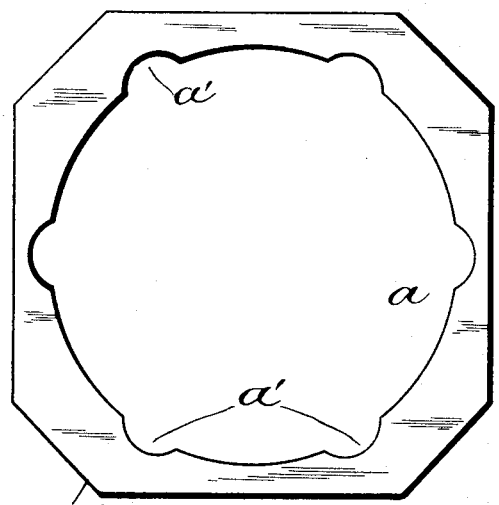
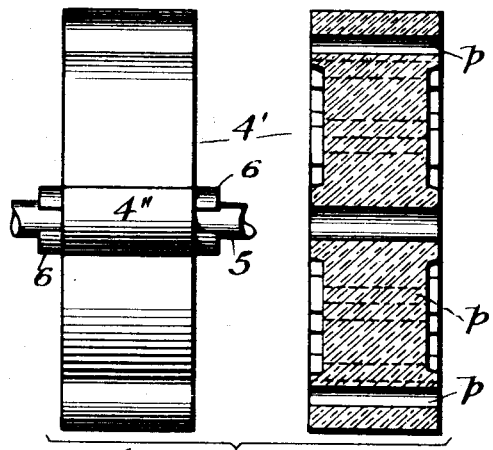
Fig. 6.  Fig. 7.
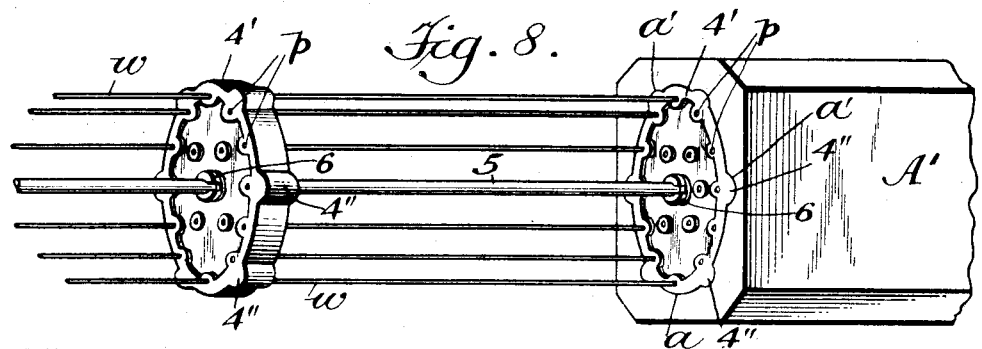
Fig. 8.

No. 792,892.

Patented June 20, 1905.

UNITED STATES PATENT OFFICE.

GUY M. GEST, OF CINCINNATI, OHIO.

SYSTEM AND MEANS FOR LAYING ELECTRICAL WIRES IN CONDUITS.

SPECIFICATION forming part of Letters Patent No. 792,892, dated June 20, 1905.

Application filed February 14, 1903. Serial No. 143,385.

*To all whom it may concern:*

Be it known that I, GUY M. GEST, a citizen of the United States, and a resident of Cincinnati, in the county of Hamilton and State of Ohio, have invented certain new and useful Improvements in Systems and Means for Laying Electrical Wires in Conduits, of which the following is a specification.

My present invention pertains to a systematic arrangement of electric wires within the ducts of subway or other conduits and to means for maintaining the wires in the systematic order of their arrangement.

Because of the danger which ordinarily attends formerly known methods of laying a plurality of naked electric wires or other electric conductors in one duct it has come to be generally accepted as a fact that the only safe method of preparing electric wires to be laid as aforesaid is to first inclose them in insulated coverings, said wires and their coverings thus forming electric cables. It will readily be noted that the cables thus formed are necessarily much more expensive than the wires alone, and even more so than wires which are laid in combination with elements or members formed of vitrified clay or some other equally effective and applicable insulating material were such elements properly devised of such a form and capable of being so used as to fully meet the requirements of perfect and permanent insulation of the wires not only relatively of the conduits, but also (which is doubtless a more important requirement) of each other.

The objects of my invention may therefore be said to pertain to the provision of suitable means for meeting the before-mentioned requirements, and I have attained these objects by providing improved supports for electric wires, including with the former improved means for retaining said supports in their proper positions, both longitudinally and, it may be said, transversely, and improved forms of said supports by which the respective relative positions of the several wires may be permanently maintained. By means of my invention, moreover, provision is made for insuring the perfect and permanent insulation of the wires regardless of any moisture which may be condensed from the surrounding air upon the surface or upon any part thereof of the supports.

In the drawings, Figure 1 is an elevation in perspective of a conduit, other elements of my invention being shown therein and a part of the conduit being broken away to more fully show said elements. Fig. 2 is a front elevation of a support. Fig. 3 is in part a side elevation and in part a central transverse vertical section of a support, other elements of my invention being also shown therein. Figs. 4 and 5, respectively, are a front elevation and a broken side elevation of Fig. 1 on a reduced scale. Fig. 6 is an end elevation of a form of an element of my invention. Fig. 7 is a view similar to Fig. 3, but of the form of the elements of my invention shown in Fig. 6. Fig. 8 is a side elevation in perspective of the last-mentioned elements, said view being on the same scale as that of Figs. 4 and 5; and Fig. 9 is a detail view.

Corresponding parts in all the figures are denoted by the same reference characters.

Referring to the drawings, A designates a conduit-section which has three separate ducts 1 2 3, electric conductors, herein termed "wires," $w$, being located in the ducts 1 and 2 and the duct 3 being left vacant for a purpose which is hereinafter related.

Wire-supports, preferably made of porcelain or glass and which may be formed of different designs, are shown herein in two forms 4 and 4', of which the form 4 is adapted for use in ducts such as 1 and 2, as shown in Figs. 1, 4, and 5, the form 4' being adapted for use in the duct $a$ of a conduit which may have either one or a plurality of ducts, but which is shown herein as a "conduit-section," so called, which has but one duct and is referred to herein as A'. Perforations $p$, formed transversely of the supports 4 4' and in which the wires $w$ rest, may be of any suitable number, provided that they be separate one from another sufficiently far apart to prevent the wires $w$ from accidentally contacting one with another under the conditions herein related. Members, herein termed "extenders," 5 are located in perforations $p'$, which are formed transversely and preferably centrally of the supports 4 4', said perforations being, if required, larger than the perforations $p$. The extenders 5 may, however, be used in any required number, one only being shown, and are preferably metal rods which may be of any desired cross-sectional form, being, however, shown herein as round. Means are provided for so engaging the extenders 5 immediately at the faces of the supports 4 or 4' as to prevent longitudinal movement of said supports upon said extenders. The means shown herein for the purpose related consist of annuli of each of which a segment has been removed. These when properly located upon the extenders 5 may be secured in position by closing them tightly upon the extenders 5, and thus clamping them upon the latter. Any suitable means may, however, be used for the purpose for which the annuli are used, as described herein and shown, said means being in a general way herein termed "wire-support contactors" and referred to by the numeral 6.

It is desirable that means shall be provided for preventing rotating or oscillating movements of any of the duct-inclosed members angularly, for instance, of the longitudinal center of the duct in which they may be inclosed. To this end the wire-supports are perimetrally so formed as to so engage parts of the inner walls of the conduits as to prevent movement such as described of any of the aforesaid inclosed parts. For this reason and also in order to have the wire-supports in convenient forms for location within the ducts of conduits the perimeters of the former are preferably symmetrical in form, and if it be rendered necessary by such perimetral form projections may be formed either on the perimeters of the wire-supports or on the inner walls of the conduits, so that said walls and said perimeters shall engage one with another to effect the purpose mentioned. Thus, it will be seen, the wire-supports 4 4' are provided with projections 4'', which engage complementary faces $a'$ of the inner walls of the conduits A A'.

The sides of the wire-supports are preferably grooved transversely, as at 4''', Figs. 2 and 3, the grooves 4''' being preferably relatively deep and narrow, so that moisture precipitated or condensed upon the surface of wire-supports shall be collected in said grooves and guided therein and away from the wires $w$. The same effect may be obtained by the form shown in Figs. 7 and 8.

The uses and advantages of my invention will be readily understood and appreciated by those skilled in the art to which it appertains. A conduit A or A' being laid in position for use, properly formed wire-supports 4 or 4' may be placed therein where required, and extenders 5 may be passed through the perforations $p'$. Wire-support contactors 6 may then be placed on the extenders 5 and in contact with the sides of the wire-supports 4 or 4' and being secured in position will prevent the wire-supports from moving longitudinally of the extenders 5, and thus also will retain the wire-supports in the respective positions in which they were severally placed. Wires $w$ may then be passed through the perforations $p$ in the wire-supports. The latter, as before related, will so engage the inner walls of the conduit as to preclude oscillation or rotation of said wire-supports in said conduit. It will be noted, therefore, that the wires $w$ when located as described cannot become twisted one with another or become contacted by reason of torsion. Moisture condensed or precipitated upon the wire-supports will be collected by the grooves 4''' and be guided to the lower inner wall of the conduit, thus preventing short-circuiting by said moisture of electric currents from the wires $w$. The vacant conduit-duct, herein referred to as 3, will receive through the joints of the conduit moisture which has been condensed as aforesaid, and said conduit-duct 3 will thus furnish means for draining the whole system as described.

It will be noted that my improved system and means for laying naked and exposed electrical conductors in conduits provides an exceedingly simple, inexpensive, and practically effective means for introducing and maintaining naked and exposed electrical conductors in the ducts of conduits in lieu of insulated cables, and the simple means comprised in my invention and improvements consists, essentially, of but two elements—to wit, the solid one-piece block formed wholly of insulating material and a set of naked conductor-wires spaced and separated in direct contact with the series of insulating-blocks common to the whole set of naked wires, said elements having a fixed relative positional maintenance independent of locking connection with the conduit.

The structural features embodied in my invention and improvements consist in a continuous imperforate conduit completely inclosing said naked electrical conductors against the outer atmosphere and moisture and having one or more interior ducts, a series of solid one-piece insulators or blocks formed wholly of insulating material and arranged at determined intervals within one or more of said ducts, which solid insulating-blocks extend transversely or across the interior area of the duct and having openings or perforations extending through their body and spaced apart, the solid one-piece blocks formed wholly of insulating material being preferably at perimetral points at bottom of the conduit-ducts of less transverse area than the interior transverse area of the duct, so that a continuous air space or drain extending in the conduit-duct throughout the longitudinal line of extension of the naked conductor-wires is provided, and said solid one-piece blocks being provided on both their vertical faces with moisture-ducts intermediate the openings or perforations which extend through the body of the block, which moisture-ducts extend downwardly.

The construction of the invention also embodies means for preventing the block from turning or twisting in its position transversely or across the interior area of the duct, the supporting of the naked electrical conductor-wires directly in the openings or perforations in the insulating-blocks, so that they contact directly, but only with said blocks, and means independent of the conductor-wires and of the conduit for connecting the insulating-blocks in longitudinal series and tensionally maintaining the blocks in relative determined position to support and maintain the naked conductor-wires in continuously-spaced and separated position.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claims.

Having thus described my invention, I claim and desire to secure by Letters Patent—

1. A system and means for laying naked and exposed electrical conductors in conduits, comprising a continuous imperforate conduit completely inclosing said naked electrical conductors against the outer atmosphere and moisture and having one or more interior ducts, a series of solid one-piece insulators or blocks formed wholly of insulating material and arranged at determined intervals within one or more of said ducts and independent of longitudinal locking connection with the conduit, said solid insulating-blocks extending transversely or across the interior area of the duct and having openings or perforations extending through their body and spaced apart, and said blocks having points on their periphery at unequal distances from the center for preventing the block from turning or twisting in its position transversely or across the interior area of the duct, naked electrical conductor-wires extending longitudinally within the duct and directly passing through the openings or perforations in said insulating-blocks and contacting directly but only with said blocks and supported thereby in spaced and separated position, and means independent of the conductor-wires and of the conduit for connecting the insulating-blocks in longitudinal series and tensionally maintaining the blocks at relative determined position to support and maintain the naked conductor-wires in continuously-spaced and separated position, substantially as and for the purpose set forth.

2. A system and means for laying naked and exposed electrical conductors in conduits, comprising a continuous imperforate conduit completely inclosing said naked electrical conductors against the outer atmosphere and moisture and having one or more interior ducts, a series of solid one-piece insulators or blocks formed wholly of insulating material and arranged at determined intervals within one or more of said ducts, said solid insulating-blocks extending transversely or across the interior area of the duct and having openings or perforations extending through their body and spaced apart and said solid or one-piece insulating-blocks being at perimetral points of less transverse area than the interior transverse area of the duct so that a continuous air-space in the duct surrounding the entire line of naked conductor-wires is provided, and said blocks having points on their periphery at unequal distances from the center for preventing the block from turning or twisting in its position transversely or across the interior area of the duct, naked electrical conductor-wires extending longitudinally within the duct and directly passing through the openings or perforations in said insulating-blocks and contacting directly but only with said blocks and supported thereby in spaced and separated position, and means independent of the conductor-wires for connecting the insulating-blocks in longitudinal series and tensionally maintaining the blocks at relative determined position to support and maintain the naked conductor-wires in continuously-spaced and separated position, substantially as and for the purpose set forth.

3. A system and means for laying naked and exposed electrical conductors in conduits, comprising a continuous imperforate conduit completely inclosing said naked electrical conductors against the outer atmosphere and moisture and having one or more interior ducts, a series of solid one-piece insulators or blocks formed wholly of insulating material and arranged at determined intervals within one or more of said ducts, said solid insulating-blocks extending transversely across the interior area of the duct and having openings or perforations extending through their body and spaced apart and said solid or one-piece blocks formed wholly of insulating material being provided on both their vertical faces with moisture-ducts intermediate the openings or perforations through their body and extending downwardly, and said blocks having points on their periphery at unequal distances from the center for preventing the block from turning or twisting in its position transversely or across the interior area of the duct, naked electrical conductor-wires extending longitudinally within the duct and directly passing through the openings or perforations in said insulating-blocks and contacting directly but only with said blocks and supported thereby in spaced and separated position, and means independent of the conductor-wires for connecting the insulating-blocks in longitudinal series and tensionally maintaining the blocks at relative determined position to support and maintain the naked conductor-wires in continuously-spaced and separated position, substantially and for the purpose set forth.

4. A system and means for laying naked and exposed electrical conductors in conduits, comprising a continuous imperforate conduit completely inclosing said naked electrical conductors against the outer atmosphere and moisture and having one or more interior ducts, a series of solid one-piece insulators or blocks formed wholly of insulating material and arranged at determined intervals within one or more of said ducts, said solid insulating-blocks extending transversely or across the interior area of the duct and having openings or perforations extending through their body and spaced apart, the solid or one-piece blocks formed wholly of insulating material being at a perimetral point at the bottom of the conduit-duct of less transverse area than the interior transverse area of the duct so that a continuous air space or drain extending in the conduit-duct throughout the longitudinal line of extension of the naked conductor-wire is provided and being also provided on both their vertical faces with moisture-ducts intermediate the openings or perforations through their body and extending downwardly, and said blocks having points on their periphery at unequal distances from the center for preventing the block from turning or twisting in its position transversely or across the interior area of the duct, naked electrical conductor-wires extending longitudinally within the duct and directly passing through the openings or perforations in said insulating-blocks and contacting directly but only with said blocks and supported thereby in spaced and separated position, and means independent of the conductor-wires for connecting the insulating-blocks in longitudinal series and tensionally maintaining the blocks at relative determined position to support and maintain the naked conductor-wires in continuously-spaced and separated position, substantially as and for the purpose set forth.

5. A system and means for laying naked and exposed electrical conductors in conduits, comprising a continuous imperforate conduit completely inclosing said naked electrical conductors against the outer atmosphere and moisture and having one or more interior ducts, a series of solid one-piece insulators or blocks formed wholly of insulating material and arranged at determined intervals within one or more of said ducts, said solid insulating-blocks extending transversely or across the interior area of the duct and having openings or perforations extending through their body and spaced apart, naked electrical conductor-wires extending longitudinally within the duct and directly passing through the openings or perforations in said insulating-blocks and contacting directly but only with said blocks and supported thereby in spaced and separated position, and means for tensionally maintaining the blocks at relative determined position to support and maintain the naked conductor-wires in continuously-spaced and separated position.

6. A system and means for laying naked and exposed electrical conductors in conduits, comprising, in combination with a conduit for completely inclosing electrical conductors against the outer atmosphere and moisture and having unobstructed ducts, a series of solid one-piece insulators or blocks formed wholly of insulating material and positioned at determined intervals within one or more of said ducts, said solid insulating-blocks extending transversely or across the interior area of the duct and having openings or perforations extending through their body and spaced apart, and naked electrical conductor-wires extending longitudinally within the duct and directly passing through the openings or perforations in the solid one-piece insulating-blocks and contacting directly but only with said blocks and supported thereby in spaced and separated position, said two elements, to wit: the solid block formed wholly of insulating material and the set of naked conductor-wires spaced and separated in direct contact with the series of insulating-blocks common to the whole set of naked wires, having a fixed relative positional maintenance independent of locking connection with the conduit and constituting a system and means for introducing and operatively maintaining naked and exposed electrical conductors in the ducts of conduits in lieu of insulated cables, substantially as set forth.

7. As an improved article of manufacture, as an insulating means for laying naked and exposed electrical conductors in conduits, a solid one-piece insulator or block formed wholly of insulating material and provided with unprotected openings or perforations extending through its body and spaced apart and provided on both its vertical faces with moisture-ducts intermediate the openings or perforations in the body and extending downwardly, said solid one-piece insulator or block being adapted to extend transversely or across the interior area of the conduit-duct.

8. A system and means for laying naked and exposed electrical conductors in conduits, comprising, in combination with a conduit provided with a duct having continuous and unobstructed inner walls, of insulating wire-supports arranged transversely within said duct at predetermined intervals, each support formed in one piece and having perforations extending therethrough and peripheral spaced projections engaging the walls of the duct and spacing the supports therefrom to form air-spaces between the projections of said supports and means independent of the conductors for rigidly connecting said supports, substantially as described.

9. A system and means for laying electrical wires in conduits, comprising a conduit having a duct, insulating wire-supports arranged transversely of the duct and provided with perforations of which one is in the center and also provided with means to engage the wall of the duct to prevent the supports from turning axially, an extender located in the central perforation of said supports and rigidly secured therein whereby to hold the supports in place, and wires held in the other perforations of said supports.

10. A system and means for laying naked and exposed electrical conductors in conduits, comprising, in combination with a conduit provided with a duct having continuous and unobstructed inner walls, of insulating wire-supports arranged transversely within said duct at predetermined intervals, each support formed of one piece and having perforations extending therethrough and peripheral spaced projections engaging the walls of the duct and spacing the supports therefrom to form air-spaces between the projections of said supports and an extender independent of the conductors, said extender passing through perforations in said supports for rigidly connecting them together, substantially as described.

In testimony whereof I have signed my name in the presence of the subscribing witnesses.

GUY M. GEST.

Witnesses:
CHAS. H. DAVIDS,
J. M. HOCTOR.